Inventor
William McMurray
by Charles W Helzer
His Attorney

Inventor
William McMurray
by Charles W Helzer
His Attorney

Inventor
William McMurray
by Charles W Helzer
His Attorney

Fig. 9 Fig. 11
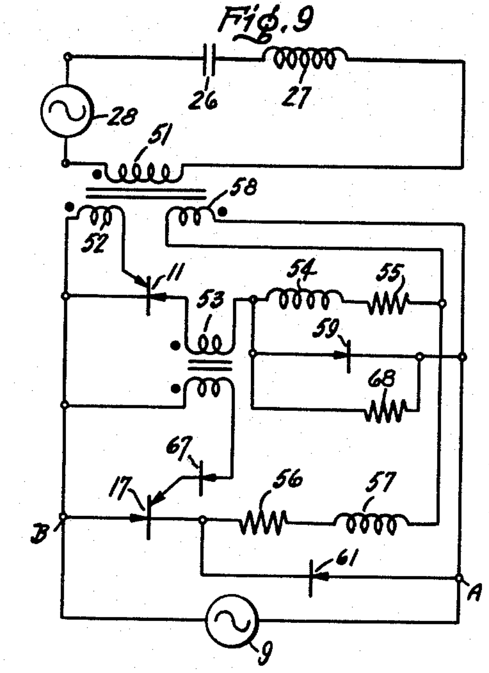
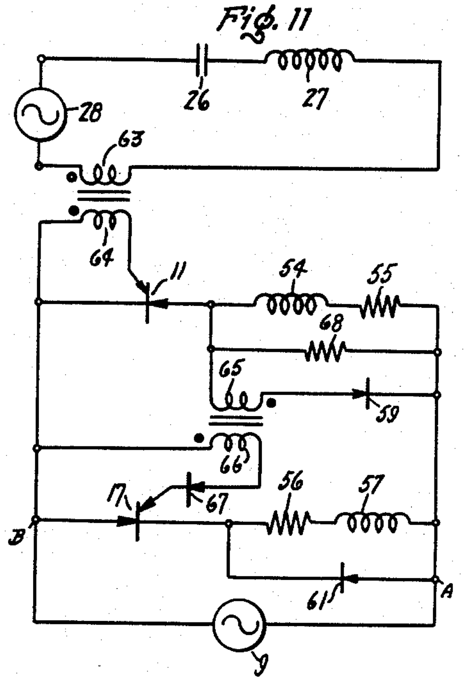
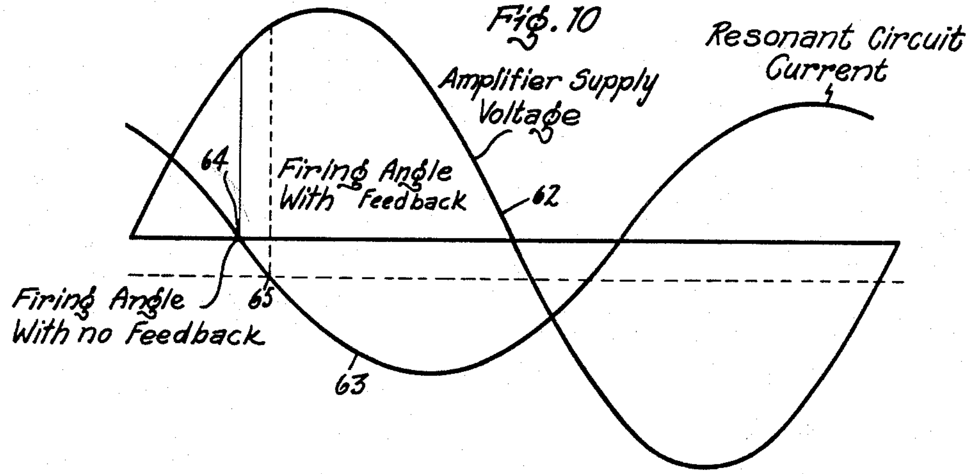
Inventor
William McMurray
by Charles W Helzer
His Attorney Inventor
William McMurray
by Charles W Helzer
His Attorney // United States Patent Office
3,176,150
Patented Mar. 30, 1965

3,176,150
MASTER SLAVE PUSH PULL AMPLIFIER UTILIZING TWO SILICON CONTROL RECTIFIERS
William McMurray, Ballston Lake, N.Y., assignor to General Electric Company, a corporation of New York
Filed Apr. 26, 1960, Ser. No. 24,743
6 Claims. (Cl. 307—88.5)

The present invention relates to a new and improved push-pull amplifier.

More particularly, the application relates to a new and improved push-pull amplifier for use with a single-ended control which is compact, economical, and efficient in operation and which includes as a novel part thereof a new and improved frequency reference circuit.

In many industrial and military applications for power amplifiers it is necessary that the amplifier be capable of supplying a double-ended load with power controlled from a single-ended source of control signals. To satisfy this need with a compact, economical, and efficient circuit, the present invention was devised.

It is therefore a primary object of the present invention to provide a new and improved push-pull amplifier employing controlled unidirectional conducting devices such as silicon controlled rectifiers which are controlled from a single-ended source of control signals.

Another object of the invention is to provide an amplifier of the above type which includes a novel frequency sensitive reference circuit for use in speed control systems.

In practicing the invention a control circuit is provided which includes a frequency reference circuit comprised by a resonant circuit tuned to a desired reference frequency and a first saturable reactor. The saturable reactor has inductively coupled primary and secondary windings with the primary winding comprising a part of the resonant circuit. A master amplifier is operatively coupled to the reference circuit and includes a silicon controlled rectifier having its control gate element coupled to the secondary winding of the first saturable reactor. A load device is connected in circuit relationship with the master controlled rectifier with the circuit thus formed being adapted to be coupled across a source of alternating current. Connected in circuit relationship with the master controlled rectifier is a charging device whereby the level to which the charging device is charged is determined by the period of conduction of the master silicon controlled rectifier during one-half cycle of the alternating current supply. And a slave controlled rectifier is connected in connected in circuit relationship with the load device, and has its gate element operatively coupled to the charging device whereby the charging device renders the slave controlled rectifier conductive for a time period during the remaining half cycle of the alternating current supply which is dependent upon the charge on the charging device.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 9 is a schematic circuit diagram of still another form of master-slave amplifier circuit constructed in accordance with the invention which is controlled by a novel frequency reference circuit having means incorporated therein for changing the firing angle at which the master circuit is fired;

FIGURE 10 is the current-voltage versus time characteristic curve of the circuit shown in FIGURE 9;

FIGURE 11 is a schematic circuit diagram of another embodiment of a master-slave power control amplifier constructed in accordance with the invention for use with split inductive loads;

Figure 1:
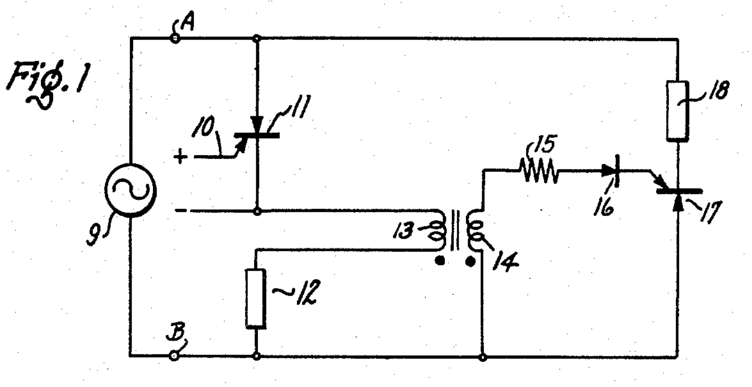
FIGURE 1 is a schematic circuit diagram of a simplified form of a master-slave amplifier constructed in accordance with the invention.

The new and improved master-slave amplifier shown in FIGURE 1 of the drawings is comprised by a master silicon controlled rectifier 11 which is connected in series circuit relationship with a load 12 across a source of alternating current supply potential 9. The controlled rectifier is a commercially available product of the General Electric Company, Semiconductor Products Department, and comprises a PNPN semiconductor having three rectifying junctions. Conduction through the controlled rectifier is initiated but not subsequently controlled by a control gate element so that the controlled rectifier in fact constitutes a solid state version of a grid controlled gaseous thyratron. The controlled rectifier 11 and load device 12 are connected in series circuit relationship with the primary winding 13 of a saturable reactor with the series circuit thus formed being adapted to be coupled across an alternating current supply source indicated generally at 9. The primary winding 13 of the saturable reactor is inductively coupled to a secondary winding 14 which has one of its terminals connected to one terminal of the alternating current supply source 9. The remaining terminal of the secondary winding 14 is connected through a current limiting resistor 15 and an isolating diode rectifier 16 to the control gate element of a slave controlled rectifier 17. The slave controlled rectifier is connected in series circuit relationship with a second load element 18, and the series circuit thus formed is connected in parallel with the first mentioned series circuit formed by the master controlled rectifier 11, primary winding 13 and first load device 12 across the alternating current supply source 9.

In operation when the polarity of the alternating current supply source is such that the terminal A is positive and the terminal B is negative, the master controlled rectifier 11 will hold off current flow through the load element 12 until such time that a positive control pulse is applied to the control gate element 10 from the single-ended source of control signals (not shown) which fires the master controlled rectifier. This condition of operation is illustrated schematically by the voltage-time characteristic curve illustrated in FIGURE 4. From an examination of FIGURE 4, it can be appreciated that from time $t_0$ to time $t_1$ the supply potential across the rectifier 11 will be increasing in a positive direction until at time $t_1$ the single-ended control voltage source fires the master controlled rectifier 11. Concurrently, it can be appreciated that the supply voltage across the slave controlled rectifier 17 is increasing in the negative direction with respect to its positive electrode, hence, this rectifier is not conditioned to become conductive. Upon the master controlled rectifier 11 being rendered conductive, load current will be drawn through the load device 12, and concurrently through the primary winding 13 of the saturable reactor. The magnetic hysteresis curve of the saturable reactor 13, 14 is illustrated in FIGURE 5 of the drawings, and it is assumed that at times $t_0$ and $t_1$ the saturable reactor is in its positive saturation condition. After time $t_1$ and during the remainder of the period $t_1$ to $t_2$ that master controlled rectifier 11 conducts, the current through the primary winding 13 resets the core of the saturable reactor 13, 14 down the left side of the curve towards negative saturation. At time $t_2$ the alternating current supply voltage passes through zero so that terminal A thereafter is rendered negative, and conduction through the controlled rectifier 11 will be discontinued. The controlled rectifier 11 then assumes its blocking condition and resetting of the core of saturable reactor 13, 14 is arrested at some intermediate point $\phi_1$ along the hysteresis curve of the core. Because the polarity of the alternating current supply voltage reverses at time $t_2$, the positive electrode of the slave controlled rectifier 17 will be enabled so that this rectifier is in a condition to be rendered conductive. However, the saturable reactor whose secondary winding 14 is connected to the control gate element of the slave controlled rectifier 17 will prevent the firing of the slave controlled rectifier at this instance due to the fact that its core has been reset towards negative saturation by the preceding half cycle of the alternating supply voltage. It is therefore necessary that the supply potential applied across the secondary winding 14 first drive the core of the saturable reactor back up the right side of the hysteresis curve shown in FIGURE 5 into positive saturation before a positive firing pulse will be applied to the control gate element of the slave controlled rectifier 17. From an examination of the voltage-time characteristic curve of FIGURE 4, it can be appreciated that the period of time $t_2$ to $t_3$ will be required to again set the core to positive saturation. By a comparison of this time period to the time period $t_1$ to $t_2$, it can be appreciated that the time periods are equal because the total magnetic flux supplied in resetting the core towards negative saturation has to be matched by the total magnetic flux supplied in again setting the core to positive saturation before the core saturates, and supplies a positive polarity gating pulse to the control gate element of the slave controlled rectifier 17. From the preceding discussion it can be appreciated that the saturable reactor 13, 14 in fact constitutes a charging device that is first charged to a predetermined level upon the master controlled rectifier 11 being rendered conductive and conducting load current through the load device 12. The charging device then serves to hold off the firing of the slave controlled rectifier 17 during the succeeding half cycle of the alternating current supply potential until such time that the charge of magnetic flux on the saturable reactor is offset by an equal value but opposite polarity charge applied for an equal period of time, and thereafter, the slave controlled rectifier 17 is allowed to to conduct load current through the load device 18. From an examination of the waveform shown in FIGURE 4, it can be appreciated that the load current will be supplied through the load device 12 for a period of time $t_1$ to $t_2$ during one-half cycle of the alternating current supply potential, and that during the succeeding opposite polarity half cycle of alternating current supply potential, load current will be supplied through the load element 18 for a period of time $t_3$ to $t_0$. It can also be appreciated that the two periods of time of load current conduction are complementary in that when summed together they make up a total period of conduction equal to one-half cycle of the operating supply potential. The circuit operates then in unsymmetrical, push-pull fashion although it is supplied from only a single-ended control signal source. Hence, it can be appreciated that the circuit makes available an extremely efficient, low cost, economical push-pull type amplifier capable of operation from a single-ended control source. During operation, the isolating diode 16 serves to augment the control gate element of the slave controlled rectifier 17 in preventing the alternating current supply potential from resetting the core of the saturable reactor 13, 14 during the period of time from $t_0$ to $t_1$ before master controlled rectifier 11 is rendered conductive. Without the isolating diode 16 in the control gate element circuit of the controlled rectifier 17, leakage current through the gate element may be sufficient to damage the slave controlled rectifier or to prematurely reset the saturable reactor 13, 14.

Figure 2:
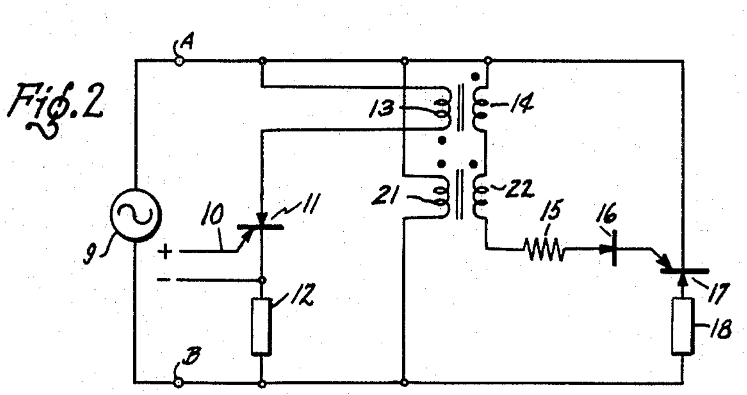
FIGURE 2 is a schematic circuit diagram of a modified form of the circuit shown in FIGURE 1, wherein smaller circuit components may be employed.

The embodiment of the invention shown in FIGURE 2 of the drawings is in many respects identical to the circuit arrangement of FIGURE 1 with the one exception that a voltage step-down transformer is provided for exciting the control gate element circuit of the slave controlled rectifier 17. For this reason like elements in the circuit arrangement of FIGURE 2 have been given the same reference number applied to corresponding elements of the circuit of FIGURE 1 since they function in identical fashion. In addition to these parts, a voltage step-down transformer is provided which includes a primary winding 21 that is coupled across the input terminals A and B of the alternating voltage supply source 9. The primary winding 21 of the voltage step-down transformer is inductively coupled to a secondary winding 22 that is connected in series circuit relationship with the secondary winding 14 of the saturable reactor, and through the current limiting resistor 15 and isolating diode 16 to the control gate element of the slave controlled rectifier 17. By reason of this arrangement, it is possible to step down the voltage applied to the control gate element of the controlled rectifier 17 thereby making it possible to use a much smaller saturable reactor 13, 14 in place of that required by the circuit arrangement of FIGURE 1.

Figure 4:
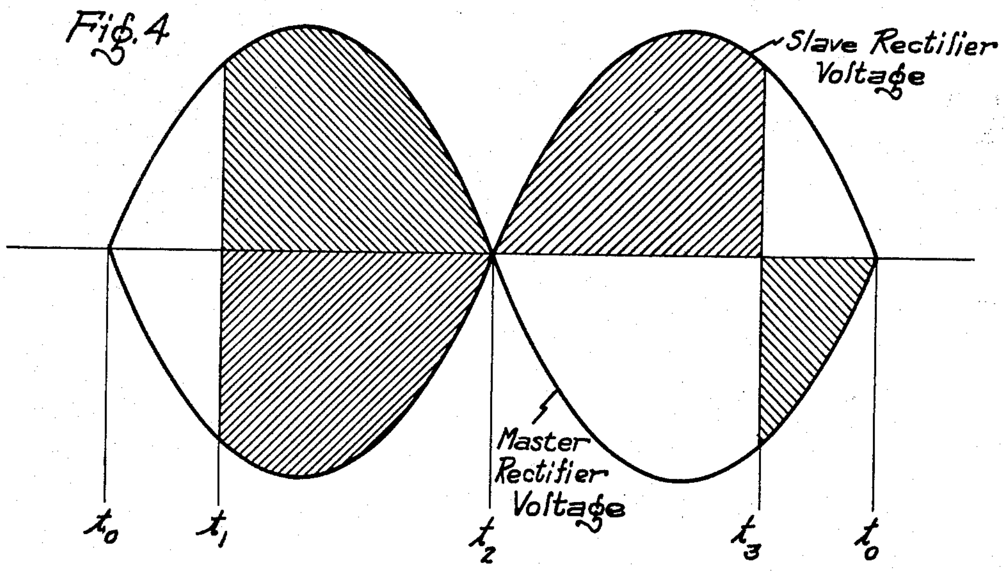
FIGURE 4 is a plot of the amplifier supply voltage versus time characteristic of the circuits shown in FIGURES 1 through 3.
Figure 5:
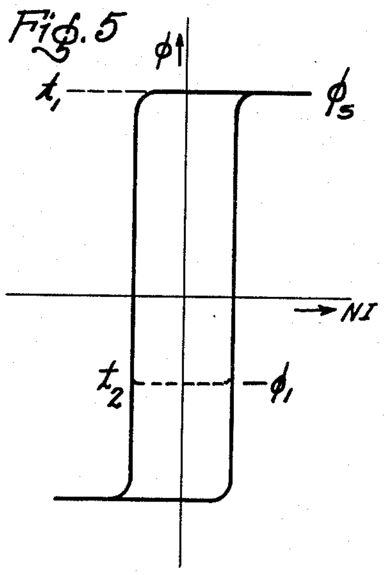
FIGURE 5 is a typical hysteresis curve of the core of a saturable core reactor that comprises a part of the amplifier circuit of FIGURES 1–3.

In operation, the circuit of FIGURE 2 will function in a manner similar to that of FIGURE 1, and hence will have a voltage-time characteristic curve similar to that shown in FIGURE 4. The master controlled rectifier 11 upon being rendered conductive will draw load current through the primary winding 13 of the saturable reactor 13, 14 and hence reset the core of the saturable reactor to a magnetic flux level indicated at $\phi_1$ in FIGURE 5. Thereafter, upon reversal of the supply voltage the saturable reactor will hold off the potential supplied from the alternating current supply 9 for a period of time $t_2$ to $t_3$ while the core is being set back up the hysteresis curve to positive saturation at level $\phi_s$. Upon this occurrence, a positive gating pulse will be produced that is supplied to the gate control element of the slave controlled rectifier 17 to render this rectifier conductive. The output load current will be similar to that shown in FIGURE 4 so that the circuit is in essence an unsymmetrical push-pull amplifier circuit similar to the arrangement of FIGURE 1. In addition to the inclusion of the voltage step-down transformer, the parts of the circuit can be much smaller, and hence the circuit is cheaper to fabricate.

Figure 3:
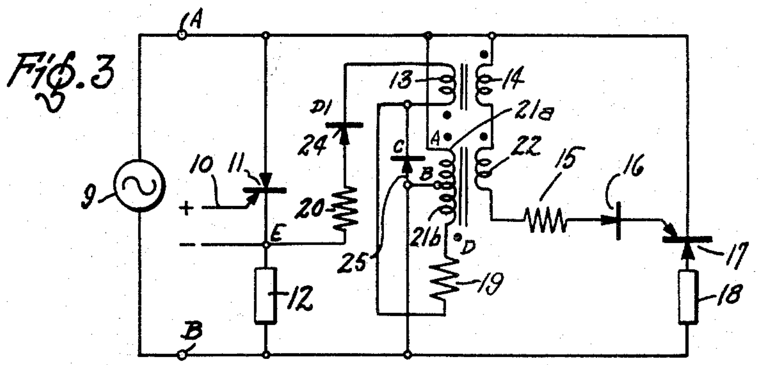
FIGURE 3 is still a third form of the circuit shown in FIGURE 1, and illustrates a circuit arrangement employing a dummy load.

Still a third embodiment of a new and improved slave controlled amplifier constructed in accordance with the invention is shown in FIGURE 3. The embodiment of the invention shown in FIGURE 3 is designed for use where large currents are required by the load device being controlled by the amplifier. In the FIGURE 3 circuit arrangement, many of the components employed in the circuits of FIGURES 1 and 2 are present, and function in the same manner to provide an unsymmetrical, push-pull output load current. The circuit of FIGURE 3 employs a master controlled rectifier 11 and a slave controlled rectifier 17 which control load current flow through load devices 12 and 18, respectively. The master controlled rectifier 11 is controlled from a single-ended source of control signals (not shown) which is applied to its gate control element through terminal 10. Connected in parallel circuit relationship with the load element 12 is a dummy load device 20 which is connected to one side of the load device 12 and is connected to the remaining side of the load 12 through an isolating diode 24 and the primary winding 13 of a saturable reactor. Connection to the remaining side of the load is achieved through a diode 25 that forms a closed series circuit with a resistor 19 and one-half winding 21*b* of a split winding transformer 21*a*, 21*b* and 22. The primary winding 21*a* of the transformer is connected directly across the terminals of the alternating current source 9, and is inductively coupled to the split winding half 21*b* and secondary winding 22. The junction of the two winding halves is connected directly to one terminal of the alternating current source and to the diode rectifier 25. By this arrangement it is possible to divert only a small part of the total load current through the saturable reactor primary winding 13 to control the slaving action of the slave controlled rectifier 17. Energization of the gate control circuit of the slave controlled rectifier 17 is achieved through the voltage step-down transformer comprised by windings 21*a* and 22 with the secondary winding 22 being connected in series circuit relationship with the secondary winding 14 of the saturable reactor, and through a limiting resistor 15 and isolating diode 16 to the gate control element of the slave controlled rectifier 17.

In operation, the circuit of FIGURE 3 operates in much the same manner as the previously described circuit of FIGURES 1 and 2. It should be noted, however, that in contrast to the circuits of FIGURES 1 and 2, only a part of the load current through the load device 12 is diverted through the dummy load 20 and is used in resetting the core of the saturable reactor 13, 14 towards negative saturation to the point $\phi_1$ on the hysteresis curve of FIGURE 5. This occurs when the polarity of the alternating current potential makes A positive and B negative, and the master controlled rectifier 11 has been turned on by the control signal. On this occasion, the potential transformed into the winding half 21*b* makes point D more negative than point B and current flows through diode rectifier 25, resistor 19, and winding half 21*b*. This results in rendering diode 25 conductive so that the points B and C are at the same potential and a back current can flow through the rectifier from point E to B thereby establishing the desired resetting current through the primary winding 13 of the saturable reactor. This condition will hold for as long as the current BCD exceeds the back current ECB and for the remainder of the positive half cycle to result in resetting the flux in the core of the reactor 13 partially down its hysteresis loop to some intermediate level $\phi_1$. During the next half cycle when A is negative and B positive, the voltage induced in winding 21*b* inversely biases diode 25 off, and diode 24 likewise is inversely biased off so that no resetting current can flow in the primary winding 13 of the saturable reactor. During this half cycle, the saturable reactor 13, 14 will hold off the positive firing potential being applied from the transformer secondary 22 to the control gate element of the slave controlled rectifier 17 for a period of time required for the core of the saturable reactor to again be set back up its hysteresis curve to positive saturation shown at the level $\phi_s$ in FIGURE 5. Upon the saturable core reactor reaching positive saturation, a positive potential will be supplied to the control gate element of controlled rectifier 17 to cause this rectifier to be rendered conductive in the manner previously described so that the load current will be supplied through the load device 18 and the resulting load voltage characteristic will be similar to that shown in FIGURE 4. Hence, it can be appreciated that the circuit operates in much the same fashion as the two previously described circuits, however, because of the provision of the dummy load bypassing the main load current A, a considerably smaller and hence cheaper to fabricate saturable reactor 13, 14 may be used to slave the slave controlled rectifier 17 to the master controlled rectifier 11.

Figure 6:
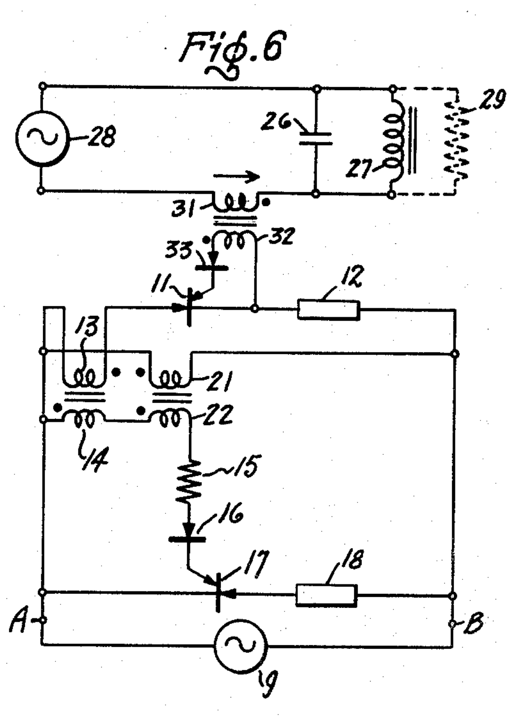
FIGURE 6 is a schematic circuit diagram of still a fourth master-slave amplifier constructed in accordance with the invention, and illustrates a new and improved frequency reference circuit that can be employed in driving the master-slave amplifier circuits of FIGURES 1–3.
Figure 8:
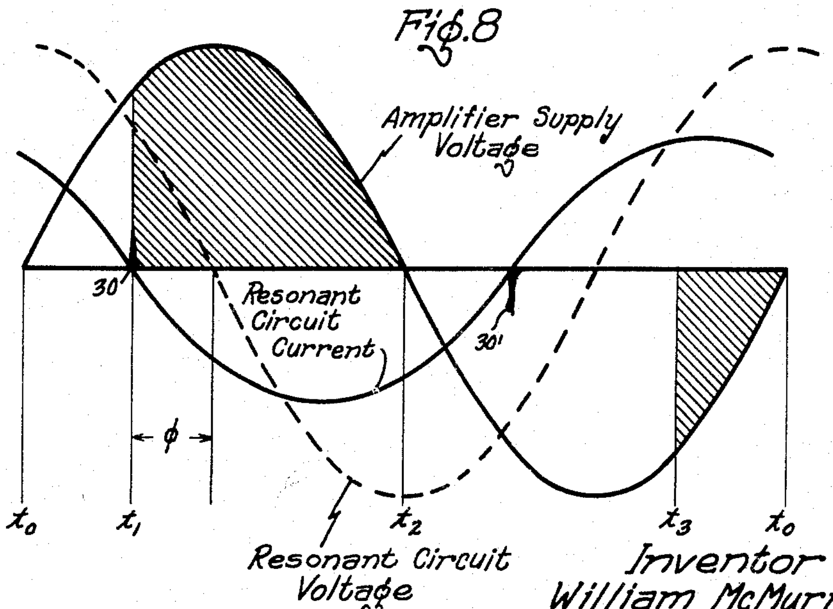
FIGURE 8 is a voltage and current versus time characteristic curve of a frequency reference circuit constructed in accordance with the invention and illustrating the manner in which the circuit operates to develop a control firing pulse for application to the master-slave amplifier circuit.

FIGURE 6 is the schematic circuit diagram of a speed control circuit employing as a part thereof a frequency reference circuit comprised by a tuned resonant circuit including a capacitor 26, and inductor 27 connected in parallel circuit relationship across a source of alternating current supply 28. The parallel tuned circuit further includes some finite value of resistance indicated by the dotted line resistor 29, and the primary winding 31 of a saturable core reactor. The saturable core reactor has its secondary winding 32 connected through an isolating diode 33 to the control gate element of a master silicon controlled rectifier 11. The silicon controlled rectifier 11 is connected in a push-pull amplifier circuit identical to that shown in FIGURE 2 of the drawings and includes a first load device 12 connected in series circuit relationship with the silicon controlled rectifier 11 and the primary winding 13 of a saturable core reactor across a source of alternating current potential 9. A slave silicon controlled rectifier 17 is connected in series circuit relationship with a second load device 18 across the source 9 in parallel with the first mentioned series circuit and the gate control element of the slave controlled rectifier 17 is connected to a gate excitation circuit. This gate excitation circuit includes the secondary winding 14 of a saturable core reactor connected in series circuit with a secondary winding 22 of a voltage step-down transformer whose primary winding 21 is connected across the source of alternating current supply 9. The series circuit comprised in part by the two secondary windings 14 and 22 further includes a current limiting resistor 15 and isolating diode 16 that is connected to the gate control element of the slave controlled rectifier. The circuit thus comprised operates in identical fashion to the circuit shown in FIGURE 2 and hence will not be further described here. It should be noted, however, that the relative phase of the two alternating current supply potentials 28 and 9 is adjusted to have the relation shown in FIGURE 8 of the drawings wherein the dotted curve represents the resonant circuit voltage 28 and as indicated leads the amplifier supply voltage 9 by 90°. It can be appreciated therefore that the two alternating current supply voltages 9 and 28 have the same frequency but are shifted in phase 90° with respect to each other. The tuned resonant circuit is tuned to resonance at the desired operating frequency of the source 28, which, for example, may be 1600 cycles per second. The current will differ in phase from the voltage across this circuit by some phase angle $\phi$ which is dependent upon the actual operating frequency. By appropriate design of the saturable core reactor 31, 32 the current flowing in the reference circuit during each half cycle of the alternating current supply voltage 28 will be adequate to drive the core into either positive or negative saturation so that at the end of each half cycle of current a trigger pulse, indicated at 30, will be produced in the secondary winding of the saturable core reactor. It can be appreciated therefore that when the alternating current supply voltage 28 is of precisely the proper phase relation with respect to the alternating current supply voltage 9, a current pulse will be produced at time $t_1$ which will trigger on the master silicon controlled rectifier 11 in the push-pull master slave amplifier circuit. Load current will then be supplied to the load device 12 for the remaining portion of the half cycle of the alternating current supply 9, the period $t_1$ to $t_2$. This load current will of course reset the saturable reactor 13, 14 towards negative saturation to the flux level indicated at a point $\phi_1$ in FIGURE 5 of the drawings during the remainder of the first half cycle of the alternating current supply 9. As the amplifier supply votage 9 passes through its zero point, conduction through the master controlled rectifier 11 will be discontinued and the polarity of the voltage supplied thereto will be reversed with respect to controlled rectifier 11. Accordingly, upon the current in the frequency reference circuit passing through its zero in going from the negative half cycle to the positive half cycle indicated at point 30, the trigger pulse produced by the reference circuit will have no effect on the master controlled rectifier 11. Thereafter, the master-slave push-pull amplifier circuit will function in precisely the same manner as the circuit arrangement of FIGURE 2 wherein the saturable reactor 13, 14 will hold off firing of the slave controlled rectifier 17 for the remainder of the period $t_2$ to $t_3$ while the saturable core reactor is being set towards positive saturation by the potential being applied from the secondary winding 22 of the voltage step-down transformer 21, 22. Upon reaching the point $t_3$ the saturable core reactor 13, 14 reaches positive saturation indicated at the point $\phi_s$ and a current pulse will be produced in the gate control circuit which is applied to the gate control element of the slave controlled rectifier 17 causing this recitfier to be rendered conductive. Conduction through the slave controlled rectifier 17 and hence through the load device 18 will then occur for the remainder of the negative half cycle of the alternating supply potential 9, indicated to be from $t_3$ to $t_0$. The circuit arrangement shown in FIGURE 6 is adapted primarily for use in a speed control system wherein variations in speed of the element being controlled will appear as a variation in the frequency of the reference voltage 28. Variations of this frequency will produce a change in the phase of the current in the resonant circuit to either advance or retard the phase angle at which the master silicon controlled rectifier 11 is fired by the gating pulse 30 relative to source 9. The resultant change in the phase angle of the firing of the master silicon controlled rectifier 11 results in putting greater or smaller amounts of load current through the load device 12 to thereby correct for the discrepancy, and to bring the system back to its correct speed. Because the frequency reference circuit is simple in construction, economical to fabricate, and yet entirely reliable in operation, it provides a greatly improved means for sensing changes in frequency which are related to changes in speed in a speed control system. The reference circuit is ideally adapted for use with the master-slave unsymmetrical, push-pull amplifier since the latter is adapted for use with a single-ended control system and yet provides a push-pull power output. Accordingly, the control system incorporates all of the advantages of both circuits in providing a very sensitive low cost speed control arrangement.

Figure 7:
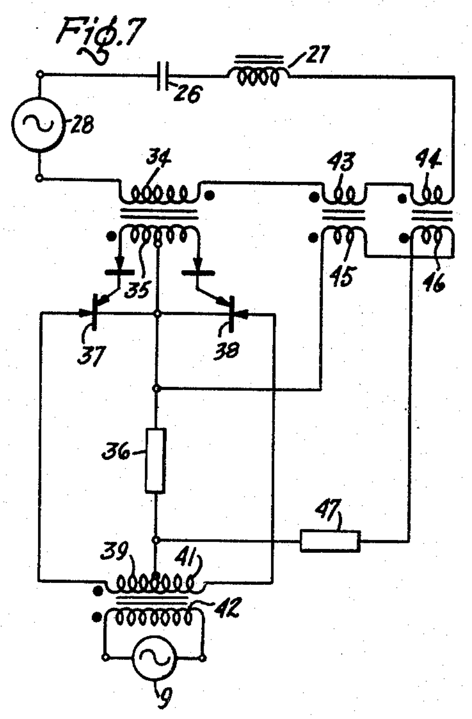
FIGURE 7 is a schematic circuit diagram of still a different form of frequency reference circuit wherein a portion of the load current appearing across the output load of an amplifier being controlled by the circuit is fed back for the purposes of modifying the resonant frequency of the circuit.

A second form of frequency reference circuit constructed in accordance with the invention is shown in FIGURE 7. In the arrangement of FIGURE 7, a series tuned resonant circuit is formed by a capacitor 26 and an inductor 27 connected in series circuit relationship across an alternating current supply voltage source indicated at 28. The series tuned circuit thus formed is also connected in series circuit relationship with the primary winding 34 of a first saturable reactor having its secondary winding 35 connected across a full wave rectifier circuit. The full wave rectifier circuit is conventional and is comprised by two half wave rectifying circuits coupled together in back to back relation and supplying a common load 36. The half wave rectifying circuits are comprised by two silicon controlled rectifiers 37 and 38 with the silicon controlled rectifier 37 being connected across one-half of the secondary winding 39 of the input transformer, and the controlled rectifier 38 being connected across the remaining half of the secondary winding 41. The primary winding 42 of the input supply transformer has its terminals connected across the source 9 of alternating current voltage. The source 9 and the frequency reference signal source 28 have the same operating frequency, but are shifted in phase 90° with respect to each other in the manner illustrated in the characteristic curve of FIGURE 8. The circuit is completed by an additional saturable reactor having a split secondary winding formed by the winding halves 43 and 44 connected in series circuit relationship with the series tuned circuit 26, 27 and the primary winding 34 of the first saturable reactor. The split secondary windings 43 and 44 of the additional saturable reactor are inductively coupled to split primary windings 45 and 46, respectively, which are connected through a feedback impedance 47 back across the load device 36 in feedback relationship.

In operation, the circuit arrangement of FIGURE 7 functions in a manner similar to that described with relation to FIGURE 6 in that the reference signal supplied from the alternating current source 28 is adjusted so that it leads the supply voltage 9 by 90° and has the same frequency. The circuit is adjusted so that as the current in the tuned circuit 26, 27 including the saturable reactors 34, 43, 44 passes through zero, the reactor 34, 35 unsaturates and produces a current pulse at 30 which will provide a positive gating pulse to the controlled rectifier 37, for example. In the next succeeding half cycle, the firing pulse 30 will serve to fire the controlled rectifier 38 so that essentially full wave rectification is accomplished with respect to the load device 36. The saturable reactors 45, 46 which are coupled back across the load device 36 through the impedance 47 serve to feed back a certain portion of the load current into the frequency reference circuit to thereby vary the tuning of the circuit in accordance with the load current being drawn. The effect of this feedback is to change the frequency at which the circuit resonates. The circuit of FIGURE 7 is particularly well adapted for a variable speed control where it is desirable that the circuit operate over a limited range of frequencies. Hence it is extremely well adapted for use with a speed control system adapted to provide for variations of speed within a limited range of speeds. By this arrangement, it is possible to reflect into the frequency of the input signal source 28 a decrease in speed which will produce an increase in the load current due to the advance of the phase angle at which the silicon controlled rectifier 37 or 38 is fired. In the case where the frequency change is to a higher value than the mean value to which the circuit is adjusted to operate, then the change will be in a direction to decrease the load current through the load device 36. This increase or decrease in load current will be reflected in an increase or decrease in the current fed back through the primary windings of the split coil saturable reactor 45 and 46, and will result in a change in the reactance that the reactors reflect into the tuned circuit through the primary windings 43, 44. This change in reactance will effectively change the resonant frequency to which the entire circuit is tuned within the limited range of frequencies at which the circuit will operate. By adjustment of the impedance 47, the amount of current fed back and hence the resonant frequency of the tuned reference circuit are controlled, thereby controlling the speed at which the speed control system will operate.

Another form of speed control circuit constructed in accordance with the invention and which employs negative feedback for speed control purposes is illustrated in FIGURE 9 of the drawings. In the arrangement of FIGURE 9, an alternating current source of control signals 28 is coupled across a frequency reference circuit comprised by a capacitor 26 and an inductor 27 connected in series circuit relationship with the primary winding 51 of a saturable core reactor. The secondary winding of the saturable core reactor 51 is connected to the control gate element of a master silicon controlled rectifier 11. The master silicon controlled rectifier 11 is connected in series circuit relationship with the primary winding 53 of a second saturable core reactor and with an inductive load device 54 and current limiting resistor 55 across an alternating current supply source 9. The circuit thus formed is connected in parallel circuit relationship with a second series circuit formed by a slave controlled rectifier 17, a limiting resistor 56, and an inductive load device 57 with the two parallel circuits having one of their terminals connected through a bias winding 58 to one side of the alternating current supply 9 and the remaining terminal connected directly to the alternating current supply source 9 to which the D.C. bias winding 58 is connected.

In operation, the circuit arrangement of FIGURE 9 functions in a very similar manner to that shown in FIGURE 7 in that the frequency reference circuit formed by the series tuned capacitor 26 and inductor 27 in series with the reactor winding 51 will develop a current pulse in the secondary winding of the saturable reactor at the end of each half cycle. During the positive half cycle of the alternating current supply 9, this current pulse serves to fire the master controlled rectifier 11. The voltage-time characteristic curve of the circuit arrangement of FIGURE 9 is illustrated in FIGURE 10 wherein the alternating current supply voltage 9 is shown at 62 and the current through the reference circuit is indicated at 63. Initially, where the current passes through a current zero during the positive half cycle of the alternating current supply voltage at point 64, the master controlled rectifier 11 will be rendered conductive. Upon this occasion, load current will be drawn through the inductive load device 54 and the primary winding 53 of the saturable core reactor. This direct current component will pass through the control winding 58 of the saturable core reactor coupled to the reference circuit so that a small D.C. bias is produced on the core of this reactor. The effect of the D.C. bias is to readjust the phase angle at which firing will occur during the following cycle of operation. This readjustment will be to a new phase angle position such as shown at 65 dependent upon the value of the direct current component, and will be retarded or advanced, depending upon the polarity of the control winding 58. Conduction through the master controlled rectifier 11 will serve to reset the core of the saturable reactor 53 towards negative saturation to a point such as $\phi_1$ shown in FIGURE 5 so that during the next half cycle of the alternating current supply source 9 the reactor 53 will have to be set back to positive saturation prior to firing the slave controlled rectifier 17 in the previously described manner. Upon the slave controlled rectifier 17 being rendered conductive, load current will be drawn through the inductive load element 57 and limiting resistor 56 and through the D.C. bias winding 58. This portion of the load current will serve to bias the core of the saturable reactor 51 in a direction to advance or retard the firing angle at which the master controlled rectifier 11 is rendered conductive for succeeding cycles. By appropriate adjustment of the value of this bias setting, it is of course possible to control the amount of current supplied through the inductive load devices 54 and 57. Following each cycle of conduction through the controlled rectifiers 11 and 17, the commutating diodes 59 and 61, respectively, serve to circulate the established load currents through the load devices 54 and 57, respectively.

Still a different form of speed control circuit constructed in accordance with the invention is shown in FIGURE 11 and includes a frequency reference circuit comprised by a series connected capacitor 26 and inductor 27 tuned to series resonance and connected in series with the primary winding 63 of a saturable reactor. The series circuit thus formed is connected across a source of alternating current reference signals 28. The secondary winding of the saturable reactor 64 is connected to the control gate element of the master silicon controlled rectifier 11 which in turn is connected in series circuit relationship with an inductive load element 54 and limiting resistor 55 across a source of alternating current potential 9. The juncture of the inductive load element 54 and controlled rectifier 11 are connected through the primary winding 65 of a saturable core reactor whose secondary winding 66 is connected through an isolating diode 67 to the control gate element of the slave controlled rectifier 17. The slave controlled rectifier 17 is connected in series circuit relationship with a limiting resistor 56 and inductive load element 57 both of which are paralleled by a commutating diode 61. A second commutating diode 59 is connected in series with the primary winding 65 of the second saturable core reactor and a ballast resistor 68 is connected across this circuit. By this arrangement, the circulated component of the load current through the inductive load device 54, connected in series circuit with the master controlled rectifier 11, is used to reset the saturable reactor 65, 66 toward negative saturation in place of the component of the load current drawn through the controlled rectifier 11. As a consequence of this arrangement, the saturable reactor 65, 66 is reset during the period of time prior to conduction of the master controlled rectifier 11, the period from time $t_0$ to $t_1$ in FIGURE 5. Hence the period of time from $t_2$ to $t_3$ during which the saturable reactor 65, 66 is set back to positive saturation, which must be equal in duration to the period of resetting action, is in this instance equal in duration to the period of time $t_0$ to $t_1$. Therefore the period of time $t_3$ to $t_0$ in which the slave controlled rectifier 17 is conductive is in this instance equal in duration to the period of time $t_1$ to $t_2$ in which the master controlled rectifier 11 is conductive. Thus, the slaving action of the slave controlled rectifier 17 is symmetrical, instead of unsymmetrical or push-pull, with respect to the master controlled rectifier 11. In other respects, the circuit of FIGURE 11 operates in identical fashion to the circuit arrangement of FIGURE 9 with the exception that there is no feedback provided to control the phase angle at which firing of the master controlled rectifier is accomplished.

Figure 12:
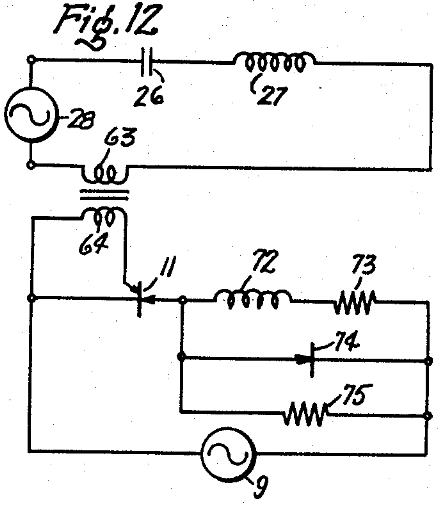
FIGURE 12 is a schematic circuit diagram of an overspeed detector circuit employing as a part thereof the novel reference frequency circuit for developing overspeed output signals.

A speed control circuit is shown in FIGURE 12 of the drawings which in fact constitutes an overspeed detector and employs the novel frequency reference circuit as a component part thereof. The frequency reference circuit is comprised by a capacitor 26 and inductor 27 connected in series circuit relationship with the primary winding 63 of a saturable core reactor. The series circuit thus formed is tuned to a desired upper limit of the operating frequency, and is connected across a source of input signals having a normal operating frequency lower than the series resonant frequency of the tuned reference circuit. The secondary winding of the saturable reactor 64 is connected to the control gate element of a controlled rectifier 71 which is connected in series circuit relationship with an inductive load element 72, and a limiting resistor 72 across the source of alternating current supply 9 which is in phase with respect to the alternating current supply 28 and has the same operating frequency. A commutating diode 74 and a ballast resistor 75 are connected in parallel circuit relationship across the load element 72 and the limiting resistor 73.

The circuit arrangement comprised in the above fashion constitutes an overspeed detector and functions in the following manner. At the desired upper limit of the operating frequency, the current and voltage through the in-resonance frequency reference circuit will be in phase, and since the two alternating current sources 9 and 28 have the same frequency and are in phase, the current pulses produced by the saturable reactor 63, 64 will occur each time the supply voltage 9 passes through its zero value so that the controlled rectifier 71 is not enabled to be rendered conductive. Accordingly, as long as the system with which the overspeed detector is used maintains its proper speed limit, no corrective action will be instituted by the circuit. In the event that the frequency drops below the resonant value, a leading current will be developed in the frequency reference circuit and the current through the primary winding 63 of the saturable reactor 63, 64 will increase through zero in advance of the positive swings of the supply voltage. Hence, for underspeed conditions, the polarity of the supply voltage across the silicon controlled rectifier 71 will be such that the circuit will not be rendered operative by the positive gating pulse. However, in the event that the frequency of the source 28 increases above the resonance value, indicating an increase in speed of the system with which the overspeed detector is used above its desired limit value, a lagging current will be produced which will increase through a current zero and thereby produce a triggering pulse subsequent to the supply voltage having passed through its zero value and provided a positive enabling potential across the controlled rectifier 71. On this occasion, the controlled rectifier will be rendered conductive, and will supply load current through a corrective device indicated by the inductive load element 72, assumed to be a relay coil or other element used to correct the overspeed condition.

Figure 13:
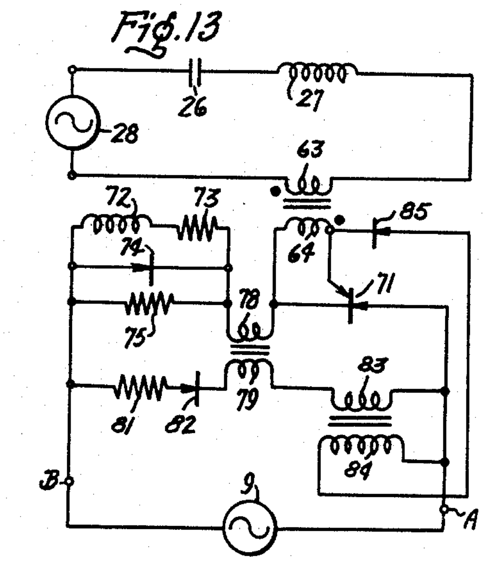
FIGURE 13 is a schematic circuit diagram of an improved form of overspeed detector circuit similar to that shown in FIGURE 12 which incorporates a means for maintaining the value of the output signal developed by the circuit for increasing deviations from a desired reference frequency.

Because the overspeed detector shown in FIGURE 12 has certain undesirable characteristics, namely, that in the event of an overspeed, the maximum value of corrective signal occurs at those overspeeds immediately adjacent the desired limit speed value, and in the event that the overspeed condition increases thereafter the corrective value of the load current developed by the circuit drops off in magnitude. In order to obviate this condition, a second overspeed detector is shown in FIGURE 13 of the drawings which includes a reference frequency circuit formed by a series connected capacitor 26 and inductor 27 and a primary winding 63 of a saturable reactor which are series tuned to a desired upper limit of the operating frequency, and are connected across the source of reference signals 28 which is representative of the speed of a device being controlled by the circuit. The saturable reactor has its secondary winding 64 connected to the gate control element of a controlled rectifier 71. Controlled rectifier 71 in turn is connected in series circuit relationship with an inductive load element 72, such as the coil of a relay, and limiting resistor 73 across a source of alternating current supply 9. Also connected in this series circuit is the primary winding 78 of a saturable core reactor whose secondary winding 79 is connected in series circuit with a limiting resistor 81, isolating diode 82, and the primary winding 83 of still a third saturable reactor. This third saturable reactor has its secondary winding 84 connected in reverse relationship through an isolating diode 85 back to the control gate element of the control rectifier 71. In this circuit arrangement the alternating supply potential 9 and reference signal 28 have the same frequency and are in phase so that as long as the frequency is at its preselected limit value which is the resonant frequency of the reference circuit, the circuit will not be activated. Similarly, if the speed drops below the desired limiting value the circuit will not be activated for the previously discussed reasons. However, in the event that the speed of the device being monitored by the circuit, and hence the frequency of the signal 28 increases above the desired limiting value, the current through the reference circuit will lag the potential thereacross sufficiently to pass through its current zero at a time when the potential supplied from the terminals 9 is positive with respect to he electrodes of the controlled rectifier 71. Upon this occasion the ensuing gating pulse will render the controlled rectifier conductive for the remainder of the positive going half cycle of the alternating current supply potential 9. Conduction through the controlled rectifier 71 will cause the saturable reactor 78, 79 to be reset down its hysteresis curve to a value such as shown at $\phi_1$ in FIGURE 5 of the drawings. Thereafter, conduction through the controlled rectifier 71 will be terminated as the alternating current voltage from source 9 passes through zero value. During the succeeding half cycle of the alternating current potential 9 when the terminal B goes positive, the rectifier 82 will be rendered conductive and the core of the second saturable reactor 78, 79 will be driven back towards positive saturation. In doing this however it should be noted that voltage will be held off of the primary winding 83 of the third saturable reactor 83, 84 so that the core of this saturable reactor will not be reset toward negative saturation, as would normally be the case had controlled rectifier 71 not been fired in the preceding half cycle. Accordingly, during the next succeeding position half cycle when the terminal A is rendered positive, a positive signal pulse will be applied through secondary winding 84 of the third saturable reactor 83, 84 and through the diode 85 to the control gate element of the controlled rectifier 71 thereby again turning on this controlled rectifier to repeat the cycle. In this manner all succeeding positive half cycles of the alternating current supply potential will result in firing the controlled rectifier 71 that produces successive current flow through the load element 72 thereby providing a steady value corrective signal until such time that the overspeed condition is corrected. Normally the circuit will not return to its quiescent condition until the overspeed has been corrected by appropriate external action, and the circuit manually reset.

Figure 14:
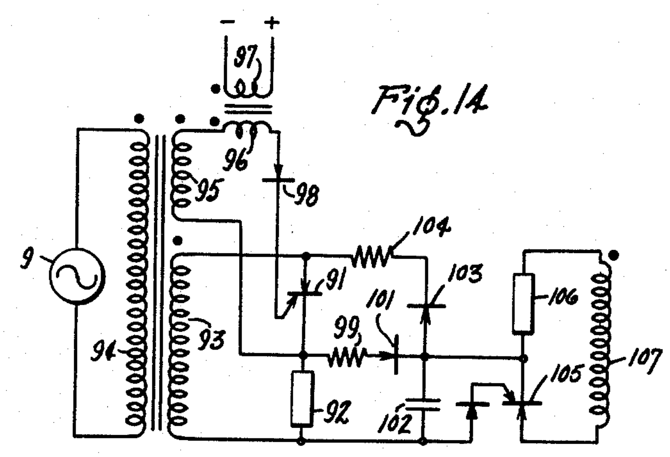
FIGURE 14 is a schematic circuit diagram of a form of master-slave amplifier circuit constructed in accordance with the invention which employs a capacitor charging device for slaving purposes.

Still another embodiment of the master-slave amplifier circuit constructed in accordance with the invention is shown in FIGURE 14 of the drawings. The FIGURE 14 embodiment of the invention does not require saturable reactors as a charging device but instead employs a charging capacitor. The circuit includes a master silicon controlled rectifier 91 which is connected in series circuit relationship with a load device 92 across the secondary winding 93 of an alternating supply transformer. The alternating supply transformer has a primary winding 94 which is connected across a source of alternating current potential 9 and which is inductively coupled to a plurality of secondary windings 93, 95, and 107. The secondary winding 95 is connected to the control gate element of the controlled rectifier 91, and for this purpose is connected in series circuit relationship with the secondary winding 96 of a control saturable core transformer whose primary winding 97 is connected to a source of control signals. The two windings 95 and 96 are connected in series through an isolating diode 98 to the control gate element of the controlled rectifier 91. The load device 92 has one terminal connected through a limiting resistor 99 and isolating diode 101 to a charging device comprising a capacitor 102. The remaining terminal of the charging capacitor 102 is connected to the remaining terminal of the load device 92 and to one terminal of the secondary winding 93. The remaining terminal of the secondary winding is connected to the master controlled rectifier 91 and through an isolating diode 103 and limiting resistor 104 back to the first mentioned terminal of charging capacitor 102 is also coupled to the termianl of charging capacitor 102 is also coupled to the gate control element of a slave controlled rectifier 105 which is connected in series circuit relationship with a load device 106 across the secondary winding 107 of the transformer whose primary winding 94 is supplied from the alternating current source 9.

In operation, upon the polarity of the alternating current potential supply source 9 rendering the dotted ends of the secondary windings 93, 95, and 107, positive, the firing of the master controlled rectifier 91 will be held off for a period of time determined by the control potential supplied from the control reactor 97, 96. Depending upon the value of this control signal, the master controlled rectifier will be fired sometime during this positive half cycle. Upon this occurrence load current will be drawn through the load device 92, and the charging capacitor 102 will be charged to a value determined by the load current, through the circuit comprised by the isolating diode 101 and the limiting resistor 99. Thereafter, during the next succeeding half cycle when the opposite end of the secondary winding 93 is rendered positive, current through the master controlled rectifier will be cut off. The charging capacitor 102 will have been charged negatively with respect to the gate control element of controlled rectifier 105 however so that the negative charge on the capacitor 102 holds off firing of the slave controlled rectifier 105 until such time that the negative charge on the capacitor 102 has leaked off through the circuit including the isolating diode 103 and the limiting resistor 104. This time period will of course be determined by the charge on the capacitor 102 which in itself is determined by the time constants of the circuit and by the length of time that the master controlled rectifier 91 conducted during the initial half cycle of the alternating current supply. Accordingly, the capacitor 102 will hold off firing of the slave controlled rectifier 105 for a period of time approximately equal to the period that the master controlled rectifier 91 was conducting, and thereafter allows the slave controlled rectifier 105 to be rendered conductive. Upon thisc occurrence, load current is supplied through the load device 106 from the transformer secondary 107.

Figure 15:
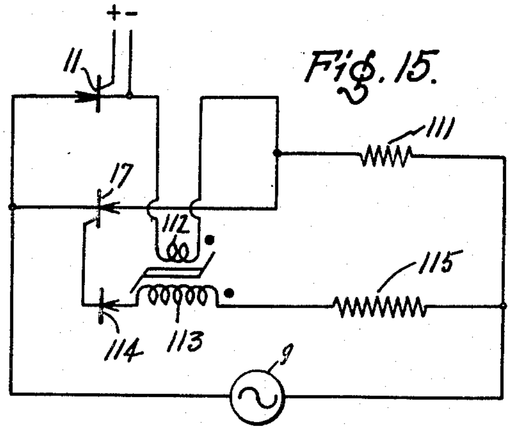
FIGURE 15 is a schematic circuit diagram of a new and improved master-slave power amplifier having a single-ended load.

Still another form of master-slave controlled rectifier circuit constructed in accordance with the invention is shown in FIGURE 15. In this arrangement, the master silicon controlled rectifier 11, which is controlled from a single-ended source of control signals (not shown), is connected in series circuit relationship with a resistive load element 111, and the primary winding 112 of a saturable core reactor. The secondary winding 113 of the saturable core reactor is connected to the gate control element of a slave controlled rectifier 17 through an isolating diode 114, and is connected through a limiting resistor 115 to one terminal of alternating current supply source 9. In effect, the alternating current supply source 9 is connected across a first series circuit formed by the controlled rectifier 11, the primary winding 112 and the resistive load device 111, and is connected across a second series circuit formed by the resistive load device 111, and the slave controlled rectifier 17. By this arrangement, upon the master controlled rectifier 11 being rendered conductive, load current will be drawn through the load device 111 and through the primary winding 112 of the saturable core reactor. This load current will result in resetting the core of the saturable reactor 112 to some predetermined magnetization level such as that shown as $\phi_1$ in the hysteresis diagram of FIGURE 5. Thereafter, during the next half cycle of the alternating current supply 14, the core of the saturable reactor 112, 113 will have to be set back up the right side of its hysteresis curve to positive saturation indicated at the point $\phi_s$ before a positive going signal pulse will be applied to the gate control element of the slave controlled rectifier 17. Upon this occurrence, the controlled rectifier 17 will be rendered conductive and allow load current to flow through the common resistive load device 111. Since the saturable core reactor 112, 113 was reset for a period of time equal to the period of conduction of the master controlled rectifier 11, the reactor will have to be set for an equal period of time prior to the firing of the slave controlled rectifier 17. Hence the periods of conduction of the two rectifiers are complementary and the circuit operates as a push-pull amplifier controlled from a single-ended source of control signals.

From the foregoing description it can be appreciated that the invention makes available a number of new and improved unsymmetrical push-pull amplifiers which employ silicon controlled rectifiers, and which are capable of being controlled from a single-ended source of control signals. Further the invention makes available amplifiers of the above type which incorporate a unique frequency sensitive reference circuit that is especially adapted for use in speed control systems. Further by simple adaptation of the basic circuits described, it is possible to vary the reference frequency to which such circuits are sensitive, and to employ the circuits in fabrication of overspeed detectors.

Having described several embodiments of the new and improved push-pull amplifier constructed in accordance with the invention, it is believed obvious that other modifications and variations of the invention are possible in the light of the above teaching. It is therefore to be understood that changes may be made in the particular embodiments of the invention described which are within the full intended scope of the invention as defined by the appended claims.

What I claim as new and desire to secure by Letters Patent of the United States is:

1. A push-pull amplifier including in combination a master gate controlled unidirectional conducting device having its control gate element coupled to a single-ended source of electric control signals, a load device connected in circuit relationship with said master unidirectional conducting device with the circuit thus formed being designed for connection to a source of alternating current supply, a charging device connected in circuit relationship with said master controlled unidirectional conducting device whereby the level to which the charging device is charged is determined by the period of conduction of the master controlled unidirectional conducting device during one-half cycle of the alternating current supply, and a slave gate controlled unidirectional conducting device connected in circuit relationship with said load device and having its gate element operatively coupled to the charging device whereby the charging device renders the slave controlled unidirectional conducting device conductive for a time period during the remaining half cycle which is dependent on the charge of the charging device.

2. The combination set forth in claim 1 wherein said charging device comprises a saturable reactor having inductively coupled primary and secondary windings with the primary winding being connected to the master controlled rectifier and the secondary winding being connected to the control gate element of the slave controlled rectifier 3. A master-slave amplifier including in combination a master gate controlled silicon controlled rectifier having its control gate element coupled to a single-ended source of electric control signals, a load device coupled in series circuit relationship with said master controlled rectifier, with the series circuit thus formed being designed for connection across a source of alternating supply potential, a charging device connected in series circuit relationship with said master controlled rectifier and with said load whereby at least a portion of the load current through said load device charges said charging device to a level dependent upon the period of conduction of said master controlled rectifier during one-half cycle of the alternating current supply, and a slave gate controlled silicon controlled rectifier connected in circuit relationship with said load device across said source of supply potential and having its control gate element coupled across said charging device to said source of supply potential whereby said slave controlled rectifier is maintained off by said charging device during the remaining half cycle of said alternating current supply for a period of time dependent upon the level to which the charging device was driven during the period of conduction of said master controlled rectifier and is thereafter rendered conductive for the remaining period of the remaining half cycle.

4. A master-slave amplifier including in combination a master gate controlled silicon controlled rectifier having its control gate element coupled to a single-ended source of electric control signals, a first load device coupled in series circuit relationship with the master controlled rectifier with the series circuit thus formed being designed for connection across a source of alternating current, a saturable reactor having inductively coupled primary and secondary windings with the primary winding being connected in series circuit relationship with said load and said master controlled rectifier, a slave gate controlled silicon controlled rectifier and a second load device connected in series circuit relationship with said second load device across the series circuit formed by said master controlled rectifier and said first load device, and a control element firing circuit comprising a limiting resistor and blocking diode connected in series circuit with the secondary winding of said saturable reactor to the control gate element of the slave controlled rectifier.

5. The combination set forth in claim 4 further characterized by a step-down transformer having inductively coupled primary and secondary windings with the primary being designed for connection across the alternating current supply and having the secondary winding thereof connected in series circuit relationship with the secondary winding of said saturable reactor to the control gate element of the slave controlled rectifier.

6. The combination set forth in claim 4 wherein the primary winding of the saturable reactor is connected in parallel circuit relationship with the first load device through a dummy load and isolating diode and further characterized by a step-down transformer having inductively coupled primary and secondary windings with the primary winding being designed for connection across the alternating current supply and having the secondary winding thereof connected in series circuit relationship with the secondary winding of said saturable reactor to the control gate element of the slave controlled rectifier.

References Cited by the Examiner

UNITED STATES PATENTS

| | | | |
|---|---|---|---|
| 2,704,815 | 3/55 | Guilles | 307—149 |
| 2,728,866 | 12/55 | Edwards | 307—149 |
| 2,785,343 | 3/57 | Wright et al. | 315—274 |
| 2,802,065 | 8/57 | Sziklai | 330—17 |
| 2,842,624 | 7/58 | March | 330—17 |
| 3,018,383 | 1/62 | Ellert | 307—88.5 |

OTHER REFERENCES

Solid State Products, Inc., publication, August 1959, "A Survey of Some Circuit Applications of the Silicon Controlled Switch and Silicon Controlled Rectifier," pages 15–17.

JOHN W. HUCKERT, *Primary Examiner.*

MILTON O. HIRSHFIELD, ROY LAKE, *Examiners.*